United States Patent
Ghera et al.

(10) Patent No.: US 7,385,754 B2
(45) Date of Patent: Jun. 10, 2008

(54) EFFICIENT WAVELENGTH REFERENCING IN A COMBINED OPTICAL AMPLIFIER-OPTICAL CHANNEL MONITOR APPARATUS

(75) Inventors: Uri Ghera, Tel-Aviv (IL); Alex Shlifer, Rehovot (IL); Tomer Eliyahu, Rishon Lezion (IL); David Menashe, Tel-Aviv (IL)

(73) Assignee: REDC Optical Networks Inc., Tel-Aviv (IL)

( * ) Notice: Subject to any disclaimer, the term of this patent is extended or adjusted under 35 U.S.C. 154(b) by 0 days.

(21) Appl. No.: 11/367,595

(22) Filed: Mar. 6, 2006

(65) Prior Publication Data
US 2007/0206273 A1  Sep. 6, 2007

(51) Int. Cl.
*H01S 4/00* (2006.01)
*H04B 10/12* (2006.01)
(52) U.S. Cl. .................... 359/337.1; 398/149
(58) Field of Classification Search ............. 359/333, 359/337.1; 398/149
See application file for complete search history.

(56) References Cited

U.S. PATENT DOCUMENTS

| | | | |
|---|---|---|---|
| 6,396,051 B1 * | 5/2002 | Li et al. | 250/227.18 |
| 6,414,787 B2 * | 7/2002 | Lutz et al. | 359/337.21 |
| 6,473,234 B2 | 10/2002 | Kuznetsov | |
| 6,509,972 B2 | 1/2003 | Korn | |
| 6,619,864 B2 | 9/2003 | Johnson et al. | |
| 6,640,027 B2 * | 10/2003 | Kim et al. | 385/28 |
| 6,704,509 B1 * | 3/2004 | Yang et al. | 398/34 |
| 6,850,655 B2 * | 2/2005 | Sorin et al. | 385/11 |
| 7,081,988 B2 * | 7/2006 | Charlet et al. | 359/337.11 |
| 2004/0161242 A1 * | 8/2004 | Xu | 398/149 |
| 2005/0232627 A1 * | 10/2005 | Sun et al. | 398/26 |

FOREIGN PATENT DOCUMENTS

KR    2001077343 A  *  8/2001

* cited by examiner

*Primary Examiner*—Eric Bolda
(74) *Attorney, Agent, or Firm*—Mark M. Friedman, Ltd.

(57) ABSTRACT

Efficient wavelength calibration in a WDM optical amplifier that includes an optical channel monitor (OCM) is obtained by introducing a notch into the amplified spontaneous emission (ASE) noise spectrum of the amplifier outside a WDM transmission band, and having the OCM detect the notch and use the notch as a reference to calibrate the wavelength measurement. The notch is introduced into the ASE noise spectrum using a notch filter, which is preferably incorporated in a gain flattening filter (GFF).

6 Claims, 10 Drawing Sheets

EFFICIENT WAVELENGTH REFERENCING IN A COMBINED OPTICAL AMPLIFIER-OPTICAL CHANNEL MONITOR APPARATUS

FIELD AND BACKGROUND OF THE INVENTION

The present invention relates to optical communication systems, and more particularly to optical amplifiers incorporating an Optical Channel Monitor (OCM) used in Wavelength Division Multiplexing (WDM) optical communication systems.

Optical amplifiers, such as Erbium Doped Fiber Amplifiers (EDFAs) and Raman amplifiers, are used in WDM optical communication systems for amplifying many wavelength channels simultaneously in the transmission band. Modem WDM systems also employ Dynamic Gain Equalizers (DGEs), Reconfigurable Optical Add Drop Multiplexing (ROADM) and Optical Cross Connects to manipulate individual wavelength channels as they are transmitted along the system. For example, DGEs are able to control the power of individual channels in order to ensure that all channels have the same optical power along the system. A ROADM module allows dynamic and reconfigurable selection of which wavelength channels are to be added or dropped at intermediate nodes of the system.

Since these wavelength manipulation devices introduce additional insertion loss into the system, they are often located at the mid-stage of double or multi-stage amplifiers typically found at each network node. This reduces the impact of the device insertion loss on system performance. Thus, the optical amplifier found at each network node often forms the heart of a local optical sub-system, including the amplifier itself and the various wavelength manipulation devices incorporated in the amplifier mid-stage.

Due to the dynamic nature of these systems and the fact that manipulation occurs at the individual channel level, OCMs are necessary to monitor the wavelength, optical power and Optical Signal to Noise Ratio (OSNR) of each channel. Typically, OCMs are located at each network node, together with the optical amplifiers and wavelength manipulation devices, and are used to provide the system management software with a full spectral picture of the system at all times.

In current network implementations, the OCM is typically located on a separate card occupying its own slot within the network rack. A much improved solution would be to integrate the OCM within the optical amplifier, thus reducing overall cost and also reducing space requirements by freeing up an extra slot. Furthermore, integrating the OCM within the amplifier would allow the amplifier itself to directly make use of the information provided by the OCM without mediation of the system management software. For example, the OCM can be used to fine tune the automatic gain control (AGC) of the amplifier in response to evolving spectral conditions (different channel loading conditions at the amplifier input). Furthermore, the OCM can be used by the amplifier to provide local management to the spectral manipulation devices located at the amplifier mid-stage. For example, the amplifier could use the OCM to check whether the channels comprising the output WDM signal have equal power, and if not provide feed-back to a DGE to achieve the required equalization.

An integrated OCM within an optical amplifier should be cost affective and have a small footprint so as not to occupy too much space on the amplifier printed circuit board (PCB). One particularly attractive option for implementing such an OCM is to use a tamable optical filter together with an optical detector. Such a filter transmits or reflects only a narrow portion of the transmission band, which can then be detected by the detector. By scanning the filter across the entire transmission band, a full spectral picture of the transmission band can be obtained, and the channel information (wavelength, power, OSNR) can be extracted using suitable signal processing methods. Tunable filters can be implemented using for example thin film technology to create a Fabry-Perot type filter, with the tuning accomplished either by temperature effects, using liquid crystals, or by tuning the angle at which the signal is incident on the filter. Other technologies for implementing tunable filters include, but are not limited to, tunable Bragg gratings and filters based on the acousto-optic effect.

A key requirement of all tunable filters is to be able to calibrate the wavelength setting of the filter. In a typical OCM application the filter will be continuously scanned across the transmission band during the entire lifetime of the system, necessarily causing some aging effect. This means that the wavelength settings of the filter may change with time. For example, if the center wavelength of the tunable filter is determined by an applied voltage, then the relation between the voltage magnitude and center wavelength will change with time. This means that if the filter is only calibrated at the production stage, then the channel wavelengths calculated and reported by the signal processing algorithms will drift with time and eventually cease to be accurate. To overcome this problem, continuous and real-time calibration is required to maintain accurate operation of the OCM throughout its lifetime.

One method to achieve such calibration employs a separate reference signal which is outside the required transmission band, and which is multiplexed with the main signal to provide a fixed reference point for the tunable filter. Such a method is described for example in U.S. Pat. No. 6,473,234 to Kuznetsov, and U.S. Pat. No. 6,509,972 to Korn. Both patents disclose the use of a broad band light source together with a fixed narrow line-width Fabry-Perot filter to provide a stable narrow reference signal for the tunable filter. U.S. Pat. No. 6,619,864 to Johnson et al discloses a similar method where the fixed narrow line-width Fabry-Perot filter is replaced with a gas cell providing narrow well defined absorption lines. U.S. Pat. No. 6,619,864 to Althouse et al describes a method where the reference signal is within the transmission band, but an optical switch is used to alternate the input to the tunable filter between the reference signal and the signal to be measured.

All the referencing methods described above require additional optical components, thus increasing the overall power and space requirements and increasing cost. Furthermore, the additional components introduce added complexity and points of failure within the system, thus reducing overall reliability. Thus, while they may be suitable for stand-alone OCMs, they are unsuitable for OCMs integrated within optical amplifiers. Therefore, there is a need for an optical channel monitor within (or combined with) an optical amplifier, which allows continuous and real-time wavelength calibration with minimum additional components and complexity.

SUMMARY OF THE INVENTION

The present invention relates to efficient wavelength calibration in an integrated or combined optical amplifier—optical channel monitor (OCM) apparatus. The efficient wavelength calibration is obtained by introducing a "notch" or notches into the amplifier amplified spontaneous emission (ASE) noise spectrum outside the WDM transmission band. Each notch is preferably a very narrow, well defined, highly attenuated region within the ASE noise spectrum. Alternatively, the notch may be a very narrow non-attenuated region in an otherwise wholly attenuated ASE noise spectrum outside the transmission band. Each notch is detected by the OCM and used as a reference to calibrate the wavelength measurement. A notch is introduced into the ASE noise spectrum using a notch filter, which is preferably incorporated in (or alternatively combined with) a gain flattening filter (GFF). This provides an easy and efficient wavelength reference.

To emphasize, the OCM detects the presence of at least one notch within the background ASE noise spectrum and uses the known wavelength position of each notch to calibrate the measured wavelength of the transmission channels. The concept of introducing a notch in the ASE noise spectrum and using for wavelength calibration is unique to the present invention.

In a preferred embodiment, the notch filter is part of a gain flattening filter (GFF). In alternative embodiments, the notch filter and gain flattening filter are separate.

In some embodiments, the OCM and the notch filter may be positioned externally to the optical amplifier and used with its generated ASE noise to provide easy referencing. Alternatively, an OCM, optical amplifier and notch filter may be integrated in a system in any combination or arrangement that provides the referencing described in detail below.

Advantageously, in "embedded" OCM embodiments in which the OCM and notch filter are integrated in the optical amplifier, the integration increases the system efficiency because it removes the need for additional components whose only purpose is to provide a wavelength reference. Thus, the cost, complexity and space requirements of the integration are significantly reduced.

According to the present invention there is provided an optical amplifier comprising at least one gain stage for amplifying an incoming optical signal within a required transmission band, the amplified signal including an ASE noise spectrum, at least one notch filter for introducing at least one notch into the ASE noise spectrum in the required transmission band; and at least one OCM operative to provide wavelength referencing based on the at least one notch.

In some embodiments of the optical amplifier of the present invention, the at least one notch filter is included in a GFF.

In some embodiments of the optical amplifier of the present invention, the at least one notch is characterized by a narrow region of high attenuation in the ASE noise spectrum.

In some embodiments of the optical amplifier of the present invention, the at least one notch includes two notches bordering externally the transmission band.

In some embodiments of the optical amplifier of the present invention, the transmission band is the C-Band and the two notches border the C-band at approximately 1 nm from each edge of the band.

In some embodiments, the optical amplifier includes at least two gain stages and the GFF is positioned between two of the gain stages.

In some embodiments of the optical amplifier of the present invention, each gain stage includes a section of Erbium doped fiber (EDF) and the optical amplifier further comprises at least one pump operative to output pump energy for pumping each EDF section and at least one WDM combiner for combining the pump energy with the optical signal.

In some embodiments, the optical amplifier further comprises a mid-stage access element positioned between two gain stages and operative to provide connectivity to external devices.

In some embodiments, the optical amplifier further comprises an additional tap and a switch for allowing alternate monitoring of the optical signal both before the mid-stage access element and at an optical amplifier output.

According to the present invention there is provided an optical communication system comprising a WDM transmitter operative to transmit at least one WDM signal channel in a required transmission band, at least one optical amplifier operative to amplify each signal channel, the amplifier having an output that includes an amplified spontaneous emission (ASE) noise spectrum, at least one notch filter operative to introduce at least one notch into the ASE noise spectrum, at least one OCM operative to provide wavelength referencing based on the at least one notch and a WDM receiver to receive the at least one WDM signal channel In some embodiments of the optical communication system of the present invention, the at least one notch filter is included in a gain flattening filter (GFF).

In some embodiments of the optical communication system of the present invention, the at least one notch filter and the OCM are integrated into a single unit.

In some embodiments of the optical communication system of the present invention, the at least one notch is a narrow region of high attenuation in the ASE noise spectrum In some embodiments of the optical communication system of the present invention, the at least one notch includes a single notch bordering the transmission band on one band side.

In some embodiments of the optical communication system of the present invention, the at least one notch includes two notches bordering the transmission band on opposite band sides.

In some embodiments of the optical communication system of the present invention, the transmission band is a C-Band and each notch is a narrow high attenuation region located approximately 1 nm from the respective edge of the C-Band.

In some embodiments of the optical communication system of the present invention, the notch filter and the OCM are integrated in the optical amplifier.

According to the present invention there is provided a method for calibrating the wavelength measurement of an OCM in a WDM optical communication system, the method comprising the steps of obtaining an amplified optical signal that includes an ASE noise spectrum, filtering the amplified optical signal to introduce at least one notch in the ASE noise spectrum outside a required transmission band, and operating the OCM to detect the at least one notch and to use the detected notch to calibrate the wavelength measurement of the OCM In some embodiments of the method of the present invention, the introducing of at least one notch includes introducing a narrow region of high attenuation in the ASE noise spectrum.

In some embodiments of the method of the present invention, the introducing of the at least one notch includes performing an action selected from the group of introducing at least one notch bordering the transmission band on one band side and introducing two notches bordering the transmission band on opposite band sides.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of the apparatus of the present invention may be better understood with reference to the drawings and the accompanying description.

Figure 1A:
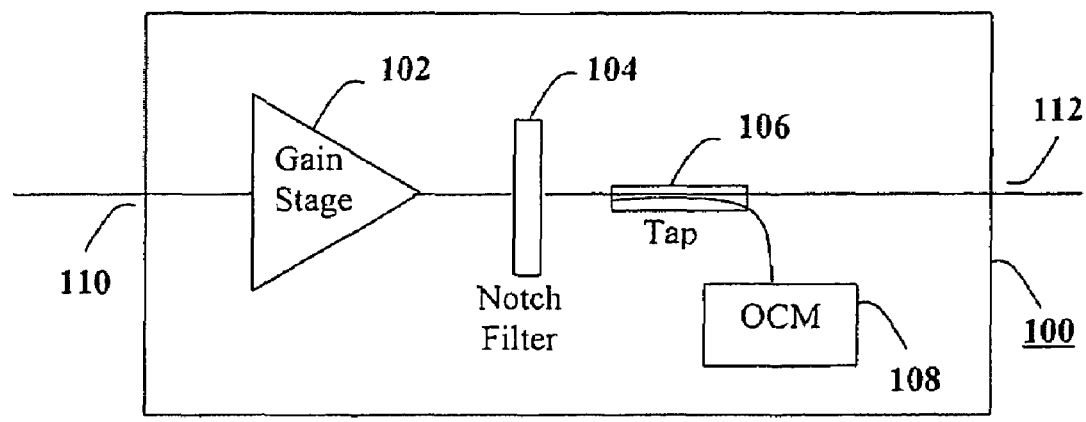
FIG. 1a describes an optical amplifier with an embedded OCM according to the preferred embodiment of the invention.

Referring now to the drawings, FIG. 1a shows an optical amplifier unit 100 with an embedded OCM according to the preferred embodiment of the invention. Unit 100 includes a gain stage 102, followed by a notch filter 104 and then an optical tap 106 which diverts a small fraction of the optical signal to an OCM 108. In operation, a WDM signal comprising at least one data channel contained within a transmission band (for example, the C-Band, between 1525 and 1565mn) enters unit 100 at a unit input 110. The WDM signal is then amplified by gain stage 102, which also introduces ASE noise within and outside the transmission band. The amplified signal and ASE noise then pass through notch filter 104, which introduces at least one notch in the ASE noise spectrum outside the transmission band. A small fraction of the combined WDM signal and filtered ASE noise spectrum is then diverted by tap 106 and is detected by OCM 108. The combined spectrum is analyzed by the OCM 108, and the notches within the spectrum are identified. Using the known and stored wavelength positions of each notch, the OCM then is able to calibrate the wavelength of all other features within the detected signal, and in particular the wavelengths of the WDM signal channels.

Gain stage 102 may be any type of optical amplifier, such as an erbium doped fiber amplifier (EDFA), Semiconductor Optical Amplifier (SOA), or Raman amplifier. Amplifier Unit 100 may include additional gain stages (not shown), which may or may not be of the same type as gain stage 102. These additional gain stages may precede or follow notch filter 104.

Figure 1B:
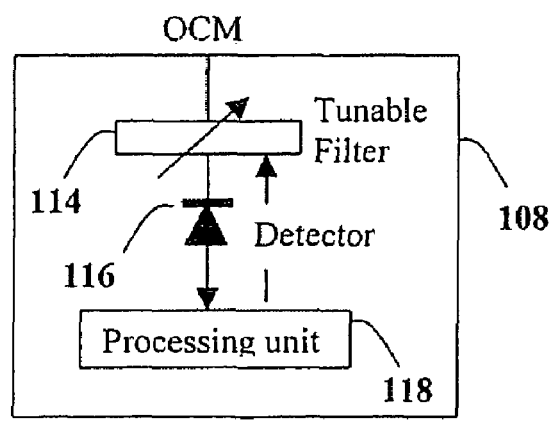
FIG. 1b shows an exemplary construction of the OCM used in the preferred embodiment of the invention.

FIG. 1b shows an exemplary implementation of OCM 108, which includes a tunable transmission filter 114, an optical detector 116 and a processing and control unit 118. In operation, processing and control unit 118 scans tunable filter 114 across a wavelength band containing within it the WDM transmission band, and also a region adjacent to the transmission band which contains the features (notches) of notch filter 104. The scan operation may be achieved, for example, by changing an applied voltage to the tunable filter. The signal detected by optical detector 116 during the scan is recorded by processing unit 118 and represents the optical power as a function of the wavelength position of the tunable filter at any given time during the scan. Unit 118 may also be part of the overall processing and control unit of amplifier unit 100 (i.e. unit 118 may perform additional functions needed to control the other components of amplifier unit 100).

OCM 108 may also be implemented with a tunable reflection filter, in which case the tunable filter reflects a narrow pass-band portion of the signal, which is then detected by an optical detector. OCM 108 may also be implemented using other methods known to the art in order to provide a spectral analysis of the signal, for example, using a wavelength spreading device (such as a grating), followed by an array of optical detectors positioned to detect different regions of the spectrum.

Figure 2:
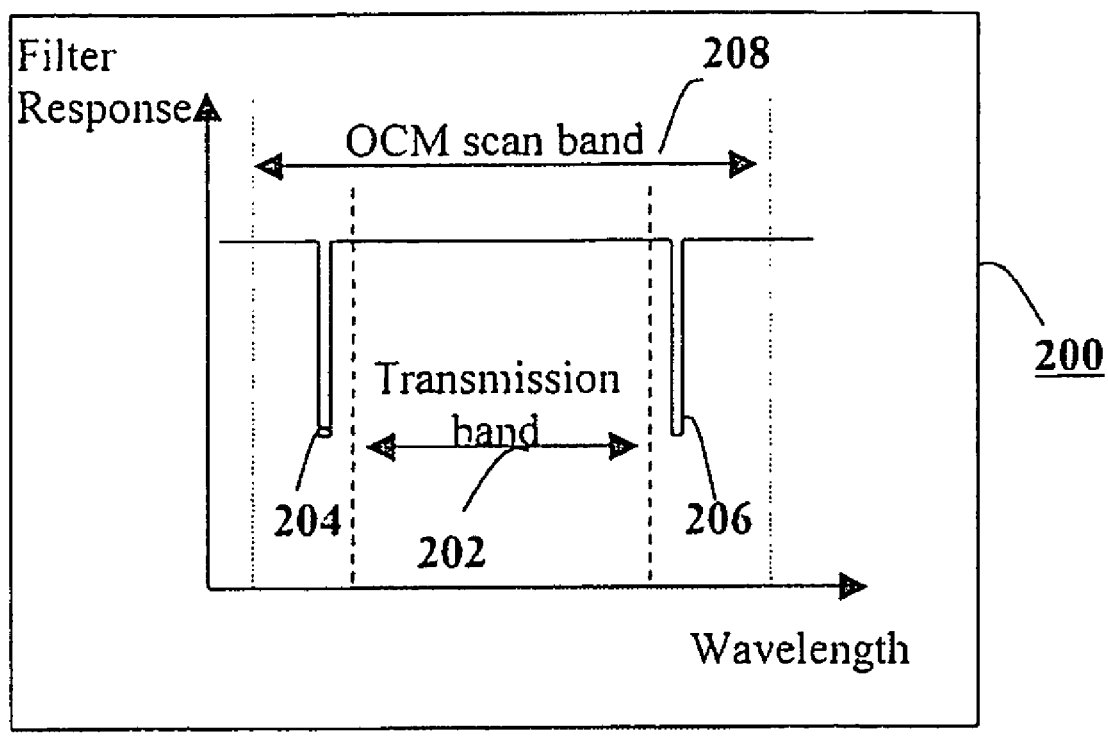
FIG. 2 shows an exemplary shape of the notch filter used in the preferred embodiment of the invention.

FIG. 2 shows an exemplary shape 200 of notch filter 104, represented by the response of the filter (e.g. transmission) as a function of wavelength. Within a WDM transmission band 202, the response of the filter is basically flat, so as not to adversely affect the WDM signals. Alternatively, the response of the filter within the transmission band may have a specific pre-determined shape used for example to compensate for the spectral gain shape of gain stage 102. In this case, notch filter 104 also functions as a gain flattening filter (GFF). Outside the WDM transmission band, notch filter 104 includes at least one feature, such as a notch 204 occurring before the transmission band (i.e. at shorter wavelengths) or a notch 206 occurring after the transmission band (i.e. at longer wavelengths). All features (e.g. notches 204 and 206) need to be contained within an OCM scan band 208 (which is the wavelength band covered by OCM 108), in order to serve the purpose of wavelength reference for the OCM. In the present example, notches 204 and 206 represent very narrow, sharply attenuated regions of the wavelength spectrum. These regions should be narrow enough to enable OCM 108 to use them to achieve wavelength calibration with the desired wavelength accuracy. For example, if the desired wavelength accuracy of OCM 108 is 0.2 nm, then notches 204 and 206 should be specifically narrower than 0.2 nm, Preferably, the response of the filter at the notch center wavelength should be attenuated by at least 20dB relative to the response level outside a region of width 0.2 nm around the notch center wavelength. The positions (center wavelength) of the notches are preferably chosen to be as close to the transmission band as possible (and always inside OCM scan band 208), but still outside it so as not to adversely affect signals within the transmission band. For example, if the transmission band is 1529-1562 nm, then notch 204 may be positioned at 1528 nm, while notch 206 may be positioned at 1563un.

While exemplary notch filter shape 200 includes two notches 204 and 206, other exemplary shapes may include only either one of the notches, or else may include additional notches. For example, if WDM transmission band 202 consists of two sub-bands separated by a vacant band, then a notch may be located within the vacant band without adversely affecting the WDM signals. In general, the number of notches required depends on the characteristics of OCM 108. In some cases only a single notch at the beginning or end of transmission band 202 will be sufficient to be used as a wavelength reference for the OCM over the lifetime of the OCM. In other cases, for example where the scan rate of the OCM may change with time, two notches will be required. In still other cases, for example when the dependence of OCM center wavelength is strongly non-linear with scan position, more than two notches may be required.

Figure 3:
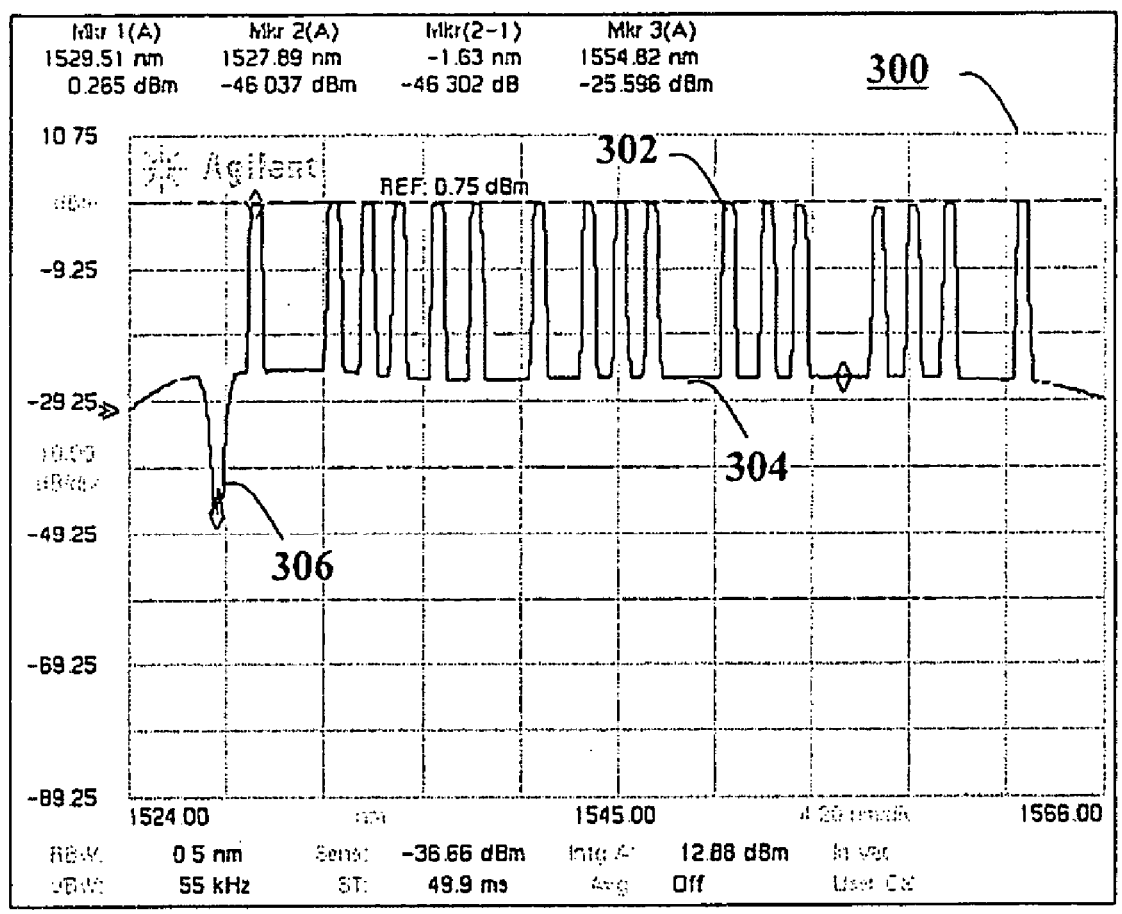
FIG. 3 shows an exemplary Optical Spectrum Analyzer (OSA) trace taken at the output of the notch filter.

FIG. 3 shows an exemplary Optical Spectrum Analyzer (OSA) trace 300 at output 112 of amplifier unit 100 (FIG. 1). In this example, the transmission band 202 is between 1529-1562 nm, and notch filter 104 (FIG. 1) includes only a single notch 204 located at about 1528 nm. WDM signal channels 302 are clearly visible on trace 300, as is an ASE background 304 generated by gain stage 102 (FIG. 1). Also clearly visible is a notch 306 in the ASE background, located at about 1528 nm and corresponding to notch 204 imposed on the spectrum by notch filter 104.

Figure 4:
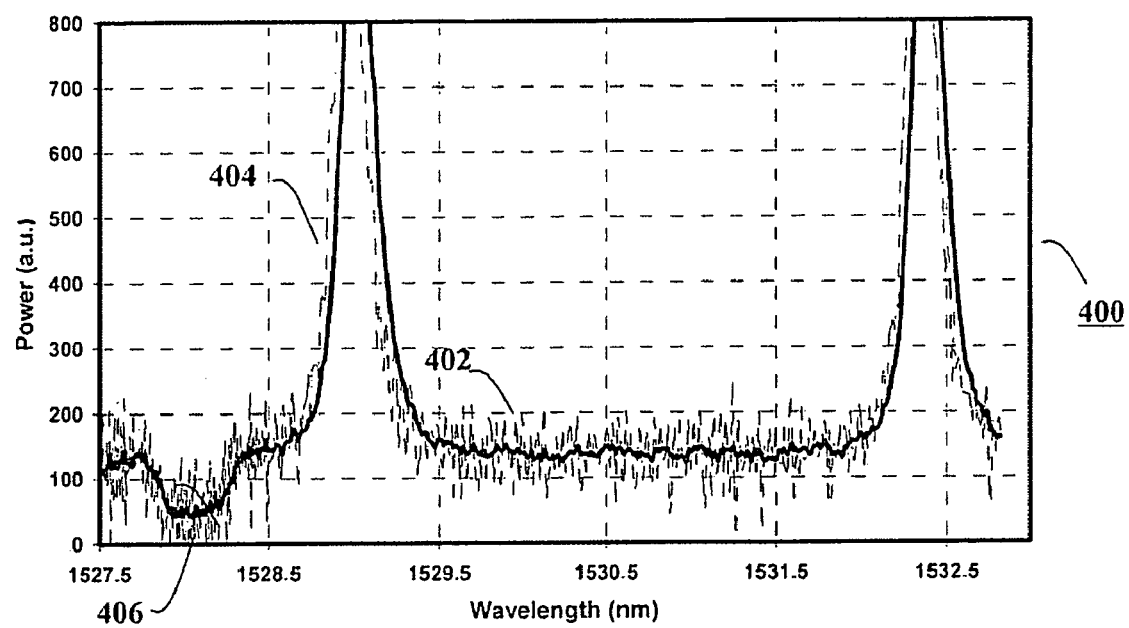
FIG. 4 shows an exemplary signal produced by the OCM, including the notch that is used for wavelength calibration of the OCM.

FIG. 4 shows an exemplary signal 400 generated by OCM 108, which corresponds to exemplary OSA trace 300 shown in FIG. 3. A raw signal 402 generated by the OCM may be quite noisy, however, this noise may be reduced by appropriate signal processing (for example, in this case a ruing average of 10 sample points) to produce a clean signal 404. This clean signal clearly shows a notch 406, which corresponds to notch 306 on OSA trace 300. Note that in this example notch 406 is smeared compared to original notch 204 introduced by notch filter 104. The reason for this is that the line-width of tunable filter 114 within the OCM is large in comparison to the width of notch 204, and the noise floor of optical detector 116 within the OCM is such that the smaller powers (compared to the minimum power of notch 406) cannot be detected. Even under these conditions, notch 406 can be clearly identified by standard signal processing algorithms, and thus serve as a wavelength reference.

Figure 5:
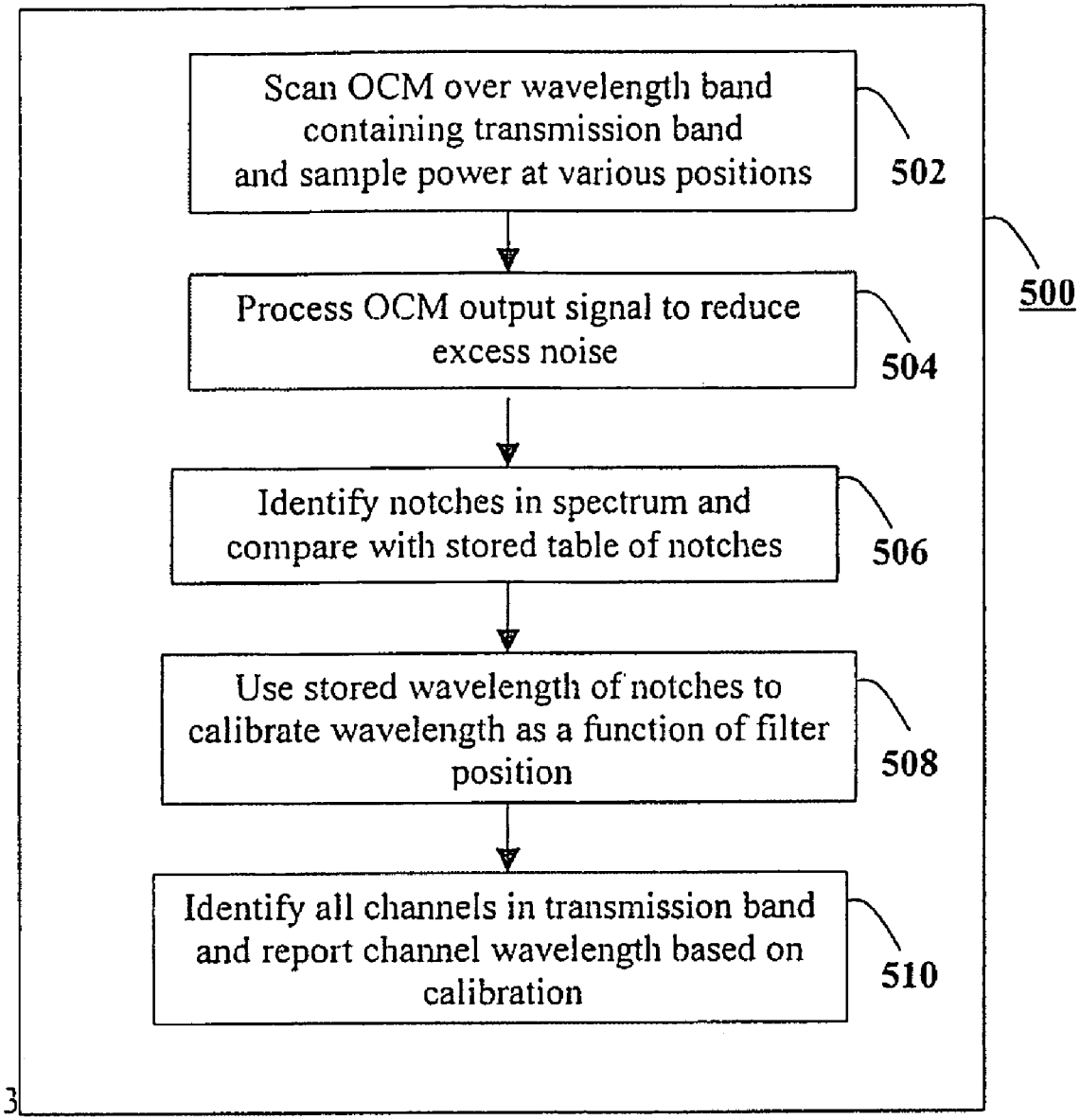
FIG. 5 shows an exemplary method by which wavelength calibration of the OCM is performed.

FIG. 5 shows an exemplary method 500 by which wavelength calibration of the OCM is performed. In step 502, the OCM is scanned across a wavelength band which contains within it the transmission band. As discussed above with reference to FIG. 2, notch filter 104 is designed such that notches 204 and 206 are contained within the OCM scan band. At various points within the scan band, the optical power is sampled and stored and constitutes the OCM output signal. In an optional step 504, the OCM output signal is processed to reduce excess noise. This step is needed only when the output signal is noisy, in which case step 504 enhances the resolution of the OCM. In step 506, the notches introduced by notch filter 104 are identified and compared with a stored table of notches found within processing and control unit 118. Step 508 uses the stored information to retrieve the wavelength of each of the notches, which are then used to calibrate the wavelength of each of the sample points in the output signal of the OCM. In step 510, the entire OCM output signal is analyzed to identify the wavelength, power and optionally the Optical Signal to Noise Ratio (OSNR) of each of the WDM signal channels. Note that, depending on the particular characteristics of OCM 108, steps 504, 506 and 508 need not necessarily be carried out every time the OCM is scanned. For example, if the OCM calibration is stable over a long period of time (e.g.

days), then steps 504, 506 and 508 need only be carried out with a frequency sufficient to keep the OCM accurately calibrated.

Figure 6:
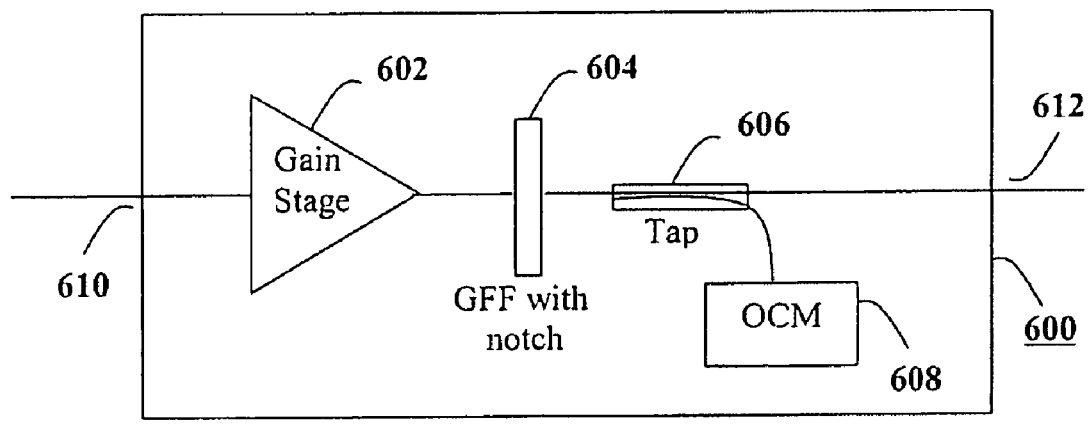
FIG. 6 describes an optical amplifier with an embedded OCM according to another embodiment of the invention.

FIG. 6 describes an optical amplifier with an embedded OCM according to another embodiment of the present invention. Elements 600-612 of this embodiment are respectively identical with corresponding elements 100-112 of FIG. 1, except that element 604 incorporates a notch filter together with a Gain Flattening Filter (GFF). Gain flattening filters are often found in optical amplifiers and are used to compensate the shape of the gain spectrum of the gain stages (such as gain stage 602) within the amplifier. For example, a gain stage comprising an Erbium Doped Fiber (EDF) will typically have higher gain in the short wavelength region of the C-Band (around 1535 nm) and lower gain at higher wavelengths. In such a case, the GFF in element 604 will be designed to have higher attenuation at the shorter wavelengths to compensate the higher gain, with the overall result being a flat spectrum. The same technology used to produce the spectral shape of the GFF (such as Bragg grating technology or thin film technology) can also be used to introduce the notches required by the notch filter. Thus both functions (GFF and notch filter) can be combined within a single component, leading to savings in cost, space, as well as reducing the overall insertion loss.

Figure 7:
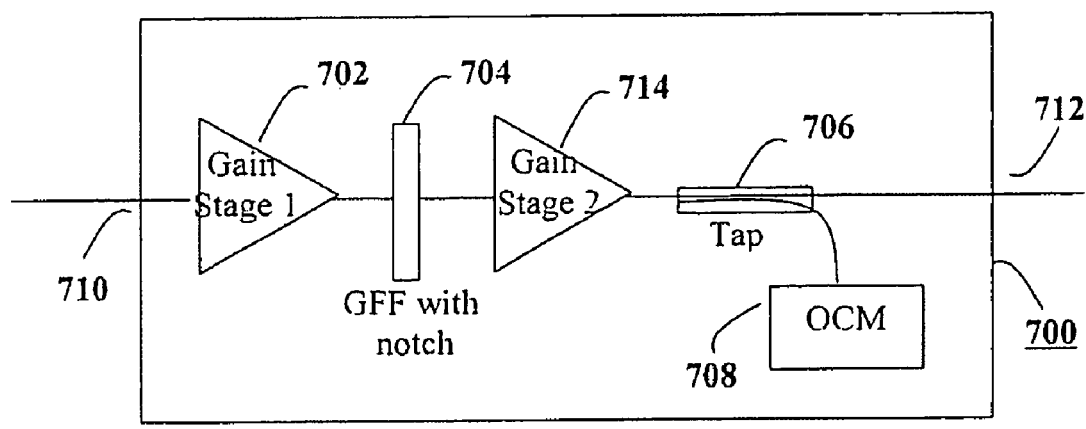
FIG. 7 describes an optical amplifier with an embedded OCM according to yet another embodiment of the invention.

FIG. 7 describes an optical amplifier with an embedded OCM according to yet another embodiment of the present invention. Elements 700-712 of this embodiment are respectively identical with corresponding elements 600-612 of FIG. 6. An added element 714 represents a second gain stage of amplifier unit 700. Second gain stage 714 may be used for example to boost the output power of the amplifier following the insertion loss introduced by combined GFF and notch filter 704. Gain stage 714 may be of the same type as gain stage 702, or of a different type. Other optical components (not shown) may also be placed adjacent to combined GFF and notch filter 704. For example, a variable optical attenuator (VOA) may be utilized to operate amplifier unit 700 as a variable gain amplifier. Additional gain stages (not shown) may be placed before or after combined GFF and notch filter 704.

Figure 8:
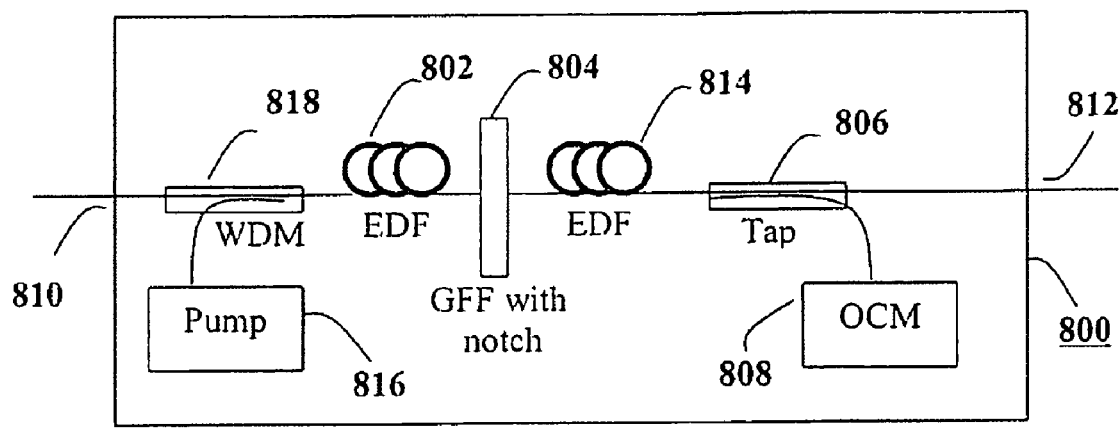
FIG. 8 describes an optical amplifier with an embedded OCM according to yet another embodiment of the invention.
Figure 9:
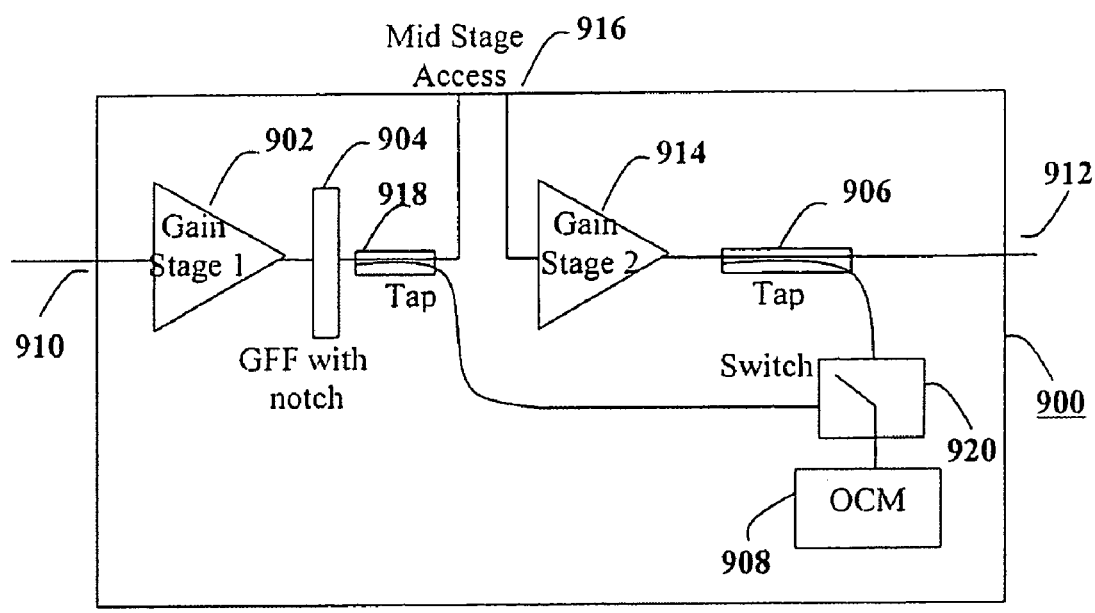
FIG. 9 describes an optical amplifier with an embedded OCM according to yet another embodiment of the invention.

FIG. 8 describes an optical amplifier with an embedded OCM according to yet another embodiment of the present invention. Elements 800-814 of this embodiment are respectively identical with corresponding elements 700-714 of FIG. 7, with the exception that elements 802 and 814 now represent passive EDF fibers, and not full gain stages. An added pump 816 coupled to the optical line through a WDM combiner 818 provides pump energy to EDF fibers 802 and 814, thus enabling optical amplification so that these fibers operate as gain stages. EDFAs comprising EDF fibers, pumps, WDM combiners and one or more GFFs are well known to the art. In this embodiment, EDF fibers 802 and 814 are pumped by the same pump 816. However, they may be pumped by separate pumps, or a splitter (not shown) may be utilized to specifically direct a pre-determined fraction of the pump power to each of the two fibers. Additional lengths of EDF fiber (not shown) may also be utilized, each with their own pumps or sharing pump power with the other EDF fibers. Other optical components (not shown) may also be placed adjacent to element 704. For example, a VOA may be utilized to operate amplifier unit 700 as a variable gain EDFA, FIG. 9 describes an optical amplifier with an embedded OCM according to yet another embodiment of the present invention. Elements 900-914 of this embodiment are respectively identical with corresponding elements 700-714 of FIG. 7. An additional element 916 allows mid stage access to the amplifier unit, so that additional devices, such as ROADM modules, DGE modules, and Dispersion Compensating Modules (DCMs) may be connected to the host communication system via amplifier unit 900. In many cases it is desirable to be able to monitor the optical spectrum both before mid-stage access (following the first gain stage) and after mid-stage access. This is particularly relevant when active spectrum manipulating devices such as ROADM modules and DGE modules are connected at mid-stage. To accomplish this, an additional optical tap 918 is placed before mid-stage and directs a small fraction of the optical signal to an optical switch 920. Optical switch 920 selects between the optical signal coming from tap 918 (before mid-stage) and that coming from tap 906 (at the amplifier output). The selected signal is then directed to OCM 908 for analysis.

In operation, switch 920 is alternately switched between the two inputs (i.e. the optical signals coming from tap 918 and tap 906) so that both the signal before mid-stage and the output signal of the amplifier are continuously monitored. It is important to note that notch filter 904 is placed before tap 918 so that all signals reaching the OCM contain the notch in the ASE noise spectrum required for providing the wavelength reference. In alternative embodiments, switch 920 may have other inputs so that other optical signals (possibly from outside amplifier unit 900) can also be monitored by OCM 908. Alternatively yet, tap 918 may be connected directly to OCM 908, in which case switch 920 is not required and OCM 908 is used only to monitor the signal output to the mid-stage. Alternatively yet, additional OCMs (not shown) may be utilized, each OCM designated to monitor a specific optical signal.

Figure 10:
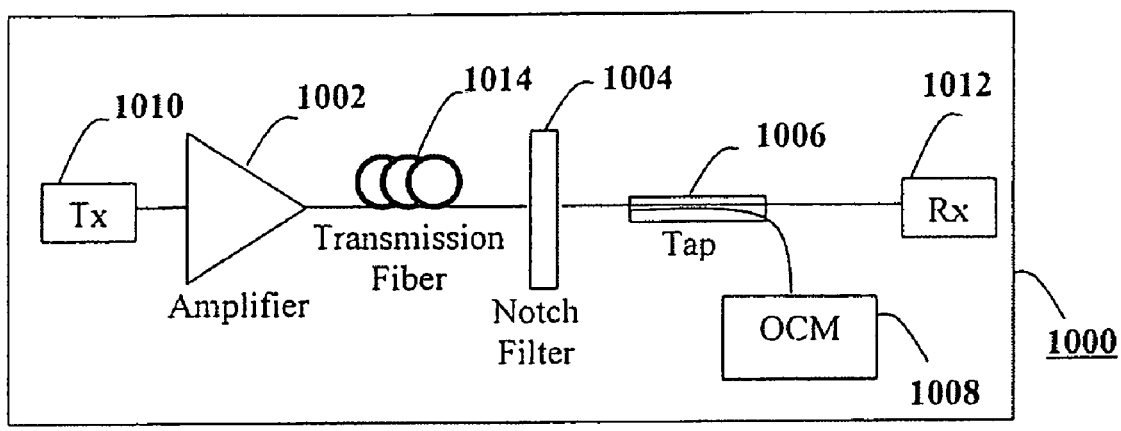
FIG. 10 describes an optical communication system including an optical amplifier and OCM according to yet another embodiment of the invention.

FIG. 10 describes an optical communication system 1000 including an optical amplifier and OCM according to yet another embodiment of the present invention. Communication system 1000 includes a WDM signal transmitter 1010 and signal receiver 1012 and a transmission fiber 1014. Elements 1002 to 1008 are analogous to elements 102 to 108 of FIG. 1. In operation, transmitter 1010 generates the WDM signal, which is amplified by optical amplifier 1002, transmitted over transmission fiber 1014 and received by receiver 1012. As in previous embodiments, notch filter 1004 introduces features (notches) in the ASE noise spectrum generated by amplifier 1002, which is outside the WDM transmission signal band. These notches are used by OCM 1008 as wavelength references for calibration. Additional transmission fiber and optical amplifiers (not shown) may be utilized as needed along the communication system. In an alternative embodiment notch, filter 1014 may be placed between tap 1006 and OCM 1008. In this way, the insertion loss of the notch filter does not affect the transmission signal and the notch filter becomes a part of the OCM unit.

All patents mentioned in this specification are herein incorporated in their entirety by reference into the specification, to the same extent as if each individual patent was specifically and individually indicated to be incorporated herein by reference.

While the invention has been described with respect to a limited number of embodiments, it will be appreciated that many variations, modifications and other applications of the invention may be made.

What is claimed is:

1. An optical amplifier comprising:
   a. at least one gain stage for amplifying an incoming optical signal within a required transmission band, the amplified signal including an amplified spontaneous emission (ASE) noise spectrum;
   b. at least one notch filter for introducing two notches into the ASE noise spectrum bordering externally the required transmission band, wherein the at least one notch filter is combined with a gain flattening filter (GFF) in a single component; and
   c. at least one optical channel monitor (OCM) configured to provide wavelength referencing based on the two notches;
   whereby the optical amplifier does not include any external light source.

2. The optical amplifier of claim 1, wherein the two notches are each characterized by a narrow region of high attenuation in the ASE noise spectrum.

3. The optical amplifier of claim 1, wherein the transmission band is a C-Band having two edges, and wherein the two notches border the C-band at approximately 1 nm from each edge.

4. The optical amplifier of claim 1, wherein the at least one gain stage includes at least two gain stages and wherein the at least one notch filter combined with a GFF in a single component is positioned between two gain stages.

5. The optical amplifier of claim 4, further comprising a mid-stage access element positioned between two gain stages and operative to provide connectivity to external devices.

6. The optical amplifier of claim 5, further comprising a tap and a switch for allowing alternate monitoring of the optical signal both before the mid-stage access element and at an optical amplifier output.

* * * * *